(12) United States Patent
Huang et al.

(10) Patent No.: US 11,398,206 B2
(45) Date of Patent: Jul. 26, 2022

(54) SIGNAL TRANSMISSION DEVICE, DONGLE DEVICE AND ADAPTOR CABLE

(71) Applicant: Realtek Semiconductor Corp., HsinChu (TW)

(72) Inventors: Yueh-Hsing Huang, HsinChu (TW); Sen-Huang Tang, HsinChu (TW); Chia-Wei Yu, HsinChu (TW); Wu-Chih Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/335,097

(22) Filed: Jun. 1, 2021

(65) Prior Publication Data

US 2022/0148532 A1     May 12, 2022

(30) Foreign Application Priority Data

Nov. 9, 2020   (TW) .................................. 109139021

(51) Int. Cl.
*G09G 5/00*        (2006.01)
*H04N 21/4363*     (2011.01)
*H04N 21/4402*     (2011.01)

(52) U.S. Cl.
CPC .............. *G09G 5/006* (2013.01); *G09G 5/005* (2013.01); *H04N 21/43635* (2013.01); *H04N 21/440263* (2013.01); *G09G 2340/0407* (2013.01)

(58) Field of Classification Search
CPC ................... G09G 5/006; G09G 5/005; G09G 2340/0407; H04N 21/43635; H04N 21/440263
See application file for complete search history.

(56) References Cited

U.S. PATENT DOCUMENTS

| 8,676,273 | B1 * | 3/2014 | Fujisaki | H04M 3/533 455/418 |
| 2011/0316990 | A1 * | 12/2011 | Saito | H04N 21/43635 348/E13.001 |
| 2013/0058416 | A1 * | 3/2013 | Tsuchiya | H04N 19/53 375/240.26 |
| 2019/0014335 | A1 * | 1/2019 | Clucas | H04N 19/42 |

FOREIGN PATENT DOCUMENTS

| TW | M568005 U | 10/2018 |
| TW | M568008 U | 10/2018 |

* cited by examiner

*Primary Examiner* — Robert J Michaud
(74) *Attorney, Agent, or Firm* — Winston Hsu

(57) ABSTRACT

A signal transmission device for transmitting at least a video signal between a player device and a display device includes a signal processing device. The signal processing device includes a receiver, a signal processor and a transmitter. The receiver is configured to receive a first video signal. The signal processor is coupled to the receiver and configured to detect an image format or an image resolution of the first video signal and process the first video signal according to the image format or the image resolution to generate a second video signal. An image format of the second video signal is different from the image format of the first video signal or an image resolution of the second video signal is different from the image resolution of the first video signal. The transmitter is configured to output the second video signal.

15 Claims, 5 Drawing Sheets

SIGNAL TRANSMISSION DEVICE, DONGLE DEVICE AND ADAPTOR CABLE

BACKGROUND OF THE INVENTION

1. Field of the Invention

The invention relates to a signal transmission device, more particularly to a signal transmission device with image/audio signal processing functionality.

2. Description of the Prior Art

Nowadays, the resolution of monitors has reached ultra-high resolutions such as 4,000 pixels (4K) or 8,000 pixels (8K), but many classic movies or game recordings were produced or shot in the era of low resolution. Unless reproduced with high-resolution photographic equipment, users cannot use advanced equipment to experience the classic works with high-resolution image quality.

To solve this problem, a novel signal transmission device with image/audio signal processing functionality is proposed. With the proposed signal transmission device, users can directly use the existing audio/video playback device to re-experience the classic works with high-resolution or ultra-high-resolution image quality without upgrading their equipment.

SUMMARY OF THE INVENTION

It is an objective of the invention to provide a signal transmission device with image/audio signal processing functionality. The proposed signal transmission device also has the properties of low production cost and easy installation. With the proposed signal transmission device, the problem of being unable to directly use the existing advanced equipment to re-present the classic works with high-resolution image quality can be solved.

According to an embodiment of the invention, a signal transmission device for transmitting at least a video signal between a player device and a display device comprises a signal processing device which comprises a receiver, a signal processor and a transmitter. The receiver is configured to receive a first video signal. The signal processor is coupled to the receiver and configured to detect an image format or an image resolution of the first video signal and process the first video signal according to the image format or the image resolution to generate a second video signal. An image format of the second video signal is different from the image format of the first video signal or an image resolution of the second video signal is different from the image resolution of the first video signal. The transmitter is configured to output the second video signal.

According to another embodiment of the invention, a dongle device comprises signal processing device, a first connector and a second connector. The signal processing device comprises a receiver, a signal processor and a transmitter. The receiver is configured to receive a first video signal. The signal processor is coupled to the receiver and configured to detect an image format or an image resolution of the first video signal and process the first video signal according to the image format or the image resolution to generate a second video signal. An image format of the second video signal is different from the image format of the first video signal or an image resolution of the second video signal is different from the image resolution of the first video signal. The transmitter is configured to output the second video signal. The first connector is coupled to the receiver. The second connector is coupled to the transmitter. The first video signal is received from a player device through the first connector and the second video signal is provided to a display device through the second connector.

According to yet another embodiment of the invention, an adaptor cable comprises a signal processing device, a cable and a connector. The signal processing device comprises a receiver, a signal processor and a transmitter. The receiver is configured to receive a first video signal. The signal processor is coupled to the receiver and configured to detect an image format or an image resolution of the first video signal and process the first video signal according to the image format or the image resolution to generate a second video signal. An image format of the second video signal is different from the image format of the first video signal or an image resolution of the second video signal is different from the image resolution of the first video signal. The transmitter is configured to output the second video signal. The cable is coupled to one of the receiver and the transmitter. The connector is coupled to another of the receiver and the transmitter. When the cable is coupled to the receiver, the first video signal is received from a player device through the cable and the second video signal is provided to a display device through the connector; and when the cable is coupled to the transmitter, the first video signal is received from the player device through the connector and the second video signal is provided to the display device through the cable.

DETAILED DESCRIPTION

Figure 1:
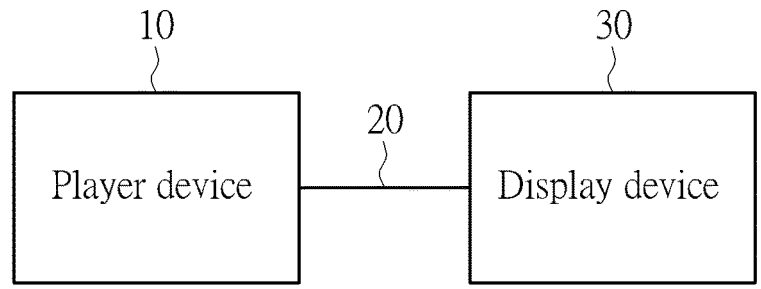
FIG. 1 is a schematic diagram of a playback system according to an embodiment of the invention.

FIG. 1 is a schematic diagram of a playback system according to an embodiment of the invention. The playback system may comprise a player device 10, a signal transmission device 20, and a display device 30. The player device 10, or, a media player, is a signal source of the playback system for providing at least one signal to be played. In the embodiment of the invention, the signal may be an image signal, an audio signal or a video signal. For brevity, these signals will be represented by the video signal in the following paragraphs. The player device 10 may be, for example, but not limited to, a mobile device such as a mobile phone or a tablet, a computing device such as a notebook computer or a desktop computer, a set-top box (STB), a compact disc (CD)/Digital Versatile Disc (DVD) player, or other devices that can provide images, audio, or video signals. The display device 30 may be, for example, but not limited to, a display panel, a screen or a digital TV for displaying the aforementioned video signal.

The signal transmission device 20 may be a pluggable or removable physical device coupled between the player device 10 and the display device 30, for transmitting at least one video signal between the player device 10 and the display device 30. When the signal transmission device 20 is coupled between the player device 10 and the display device 30, the signal to be played may be transmitted from the player device 10 to the display device 30 through the signal transmission device 20, and before the signal is provided to the display device 30, the signal transmission device 20 may selectively perform appropriate processing on the signal to improve the signal resolution and/or enhance the signal quality (more details will be introduced in the following paragraphs).

It is to be noted that FIG. 1 is a simplified block diagram of the playback system, in which the signal transmission device 20 is represented by the form of a line. However, the proposed signal transmission device 20 is not limited to the shape as shown in the figures. In the embodiment of the invention, the signal transmission device 20 may be implemented as a variety of different products. Depending on the type of product being implemented, the signal transmission device 20 may have a corresponding shape. For example, the signal transmission device 20 may be implemented as a dongle, a cable, an adaptor cable, etc. Therefore, the signal transmission device 20 may actually comprise one or more of a connector or a plug for connecting the player device 10 and the display device 30 and a cable or a transmission line for transmitting video signals. In addition, it is to be noted that only the components relevant to the invention are shown in FIG. 1. As will be readily appreciated by a person of ordinary skill in the art, a playback system may further comprise other components not shown in FIG. 1 for implementing the functionalities of displaying or playing the image, audio, or video signals.

In the embodiments of the invention, in order to perform appropriate processing on the signal, the signal transmission device 20 may comprise at least one signal processing device (e.g., the signal processing device 200 which will be described later). The signal processing device may comprise a receiver, a signal processor and a transmitter. The receiver may be configured to receive the video signal (e.g., the first video signal) provided by the player device 10. The signal processor is coupled to the receiver and configured to detect an image format or an image resolution of the first video signal and process the first video signal according to the image format or the image resolution in order to generate a second video signal. An image format of the second video signal may be different from the image format of the first video signal and/or an image resolution of the second video signal may be different from the image resolution of the first video signal. The transmitter may be configured to output the second video signal, so that the second video signal is provided to the display device 30.

Figure 2:
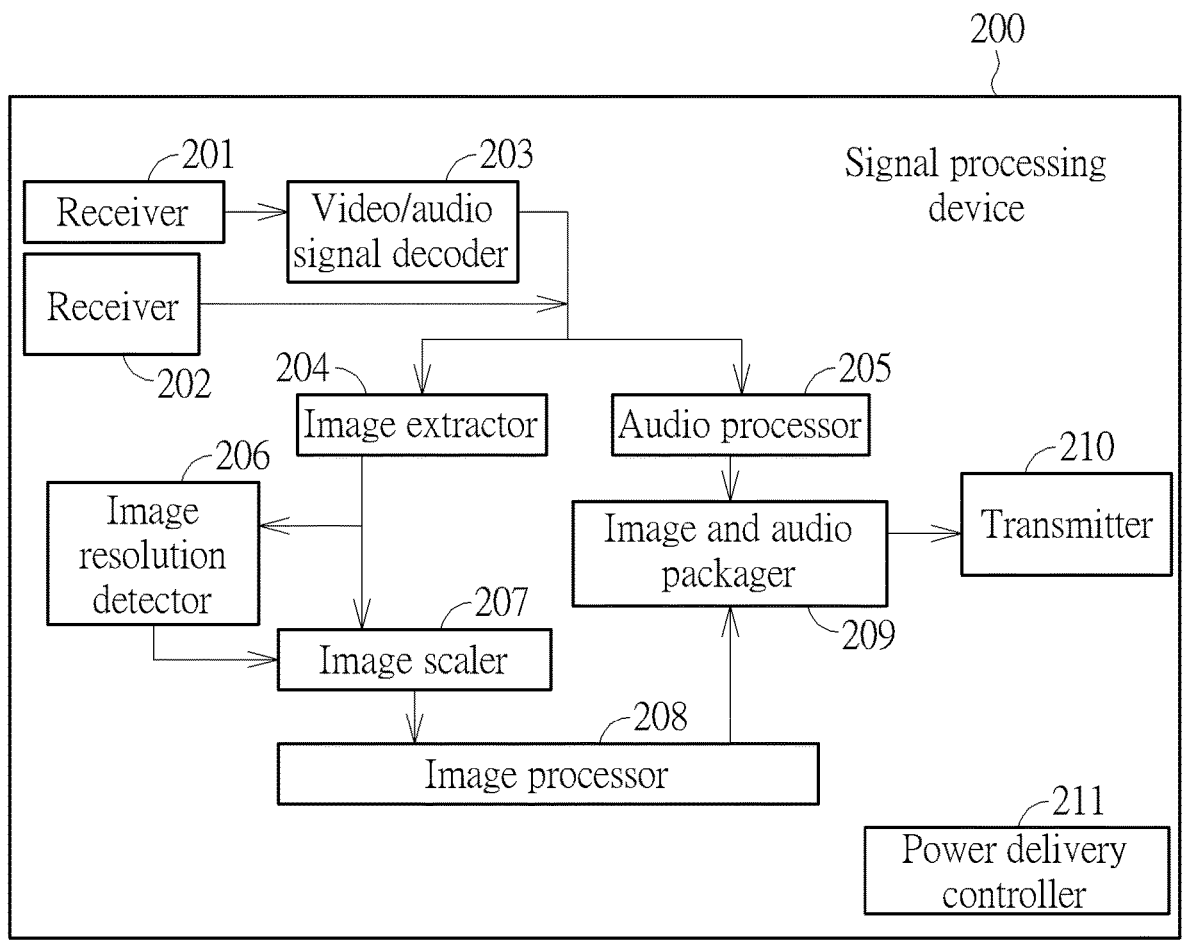
FIG. 2 shows an exemplary block diagram of the signal processing device according to an embodiment of the invention.

FIG. 2 shows an exemplary block diagram of the signal processing device according to an embodiment of the invention. The signal processing device 200 may comprise a plurality of functional blocks, and each functional block may be configured to perform corresponding signal processing. The aforementioned functional blocks may be implemented by corresponding hardware circuits and may be integrated into a signal processor. The aforementioned functional blocks may also be implemented by a microprocessor executing corresponding software or firmware, and the microprocessor becomes the signal processor comprised in the signal processing device 200 when executing the corresponding software/firmware. In addition, the implementation of the aforementioned functional blocks may also be a combination of the aforementioned two implementations.

The signal processing device 200 may comprise one or more receivers, e.g., the receiver 201 and the receiver 202. When the signal processing device 200 comprises a plurality of receivers, each receiver may be configured to receive and transmit signals in compliance with different transmission interface standards. For example, in one embodiment of the invention, the receiver 201 may be a Universal Serial Bus (USB) receiver. The receiver 202 may be a High Definition Multimedia Interface (HDMI) receiver. When the player device 10 is a product with a USB interface, the receiver 201 may receive the video signal to be played by the player device 10 through the USB interface. Similarly, when the player device 10 is a product with an HDMI interface, the receiver 202 may receive the video signal to be played by the player device 10 through the HDMI interface.

The signal processing device 200 may further comprise a video/audio signal decoder 203, an image extractor 204, and an audio processor 205. The video/audio signal decoder 203 may be configured to decode the received video signal or audio signal into a predetermined format based on requirements. The image extractor 204 may extract image data from the video signal. The audio processor 205 may extract audio data from the video signal, and process the audio signal according to the audio format, for example, performs audio signal processing on the audio data. The audio signal processing may be, for example, but not limited to, noise elimination, signal purification, signal amplification or others.

In addition, the signal processing device 200 may further comprise an image resolution detector 206, an image scaler 207 and an image processor 208. The image resolution detector 206 is configured to detect the image resolution. For example, the image resolution detector 206 may acquire the image resolution by analyzing the content of the header of the image data, or by analyzing the communication signal transmitted between the player device 10 and the display device 30 to obtain information regarding the image resolution. The image scaler 207 is configured to scale the image. For example, the image scaler 207 may adjust the size and/or resolution of the image based on the current image resolution, for example, using an image interpolation method to add image points, so as to improve the resolution of the output image. The image processor 208 is configured to perform corresponding processing, such as, but not limited to, edge sharpening, denoising, contrast enhancement, smoothing processing, etc., according to the current image format and image resolution to further improve image quality.

The signal processing device 200 may further comprise an image and audio packager 209, a transmitter 210, and a power delivery controller 211. The image and audio packager 209 is configured to package the processed audio data and image data into video signals. The transmitter 210 is configured to output the video signals. The power delivery controller 211 is configured to acquire power from the peripheral devices (e.g., the player device 10 or the display device 30) coupled thereto, and provide the power to the internal components of the signal processing device 200 (noted that the coupling relationship between them is not shown in FIG. 2) for the internal components to operate.

Figure 3:
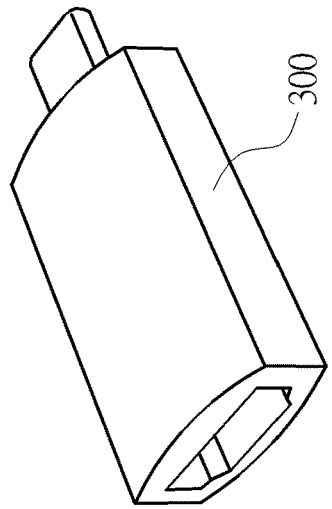
FIG. 3 is a schematic diagram showing a dongle device product according to an embodiment of the invention.

According to a first embodiment of the invention, the signal transmission device 20 may be implemented as or comprised in a dongle device. FIG. 3 is a schematic diagram showing a dongle device product according to an embodiment of the invention. The dongle device 300 may comprise the aforementioned signal processing device and a plurality of connectors, for example, a first connector coupled to a player device (e.g., the player device 10 in FIG. 1) and a second connector coupled to a display device (e.g., the display device 30 in FIG. 1), where the said connectors may also be a plug or a socket. In the embodiments of the invention, when the signal transmission device 20 is implemented as or comprised in a dongle device (e.g., the dongle device 300), the signal transmission device 20 may be connected to one of a player device and a display device through a connector of the dongle device 300, and connected to a cable (not shown in FIG. 3) or a transmission line through another connector of the dongle device 300, and then connected to another of the player device and the display device through this cable or transmission line.

Figure 4:
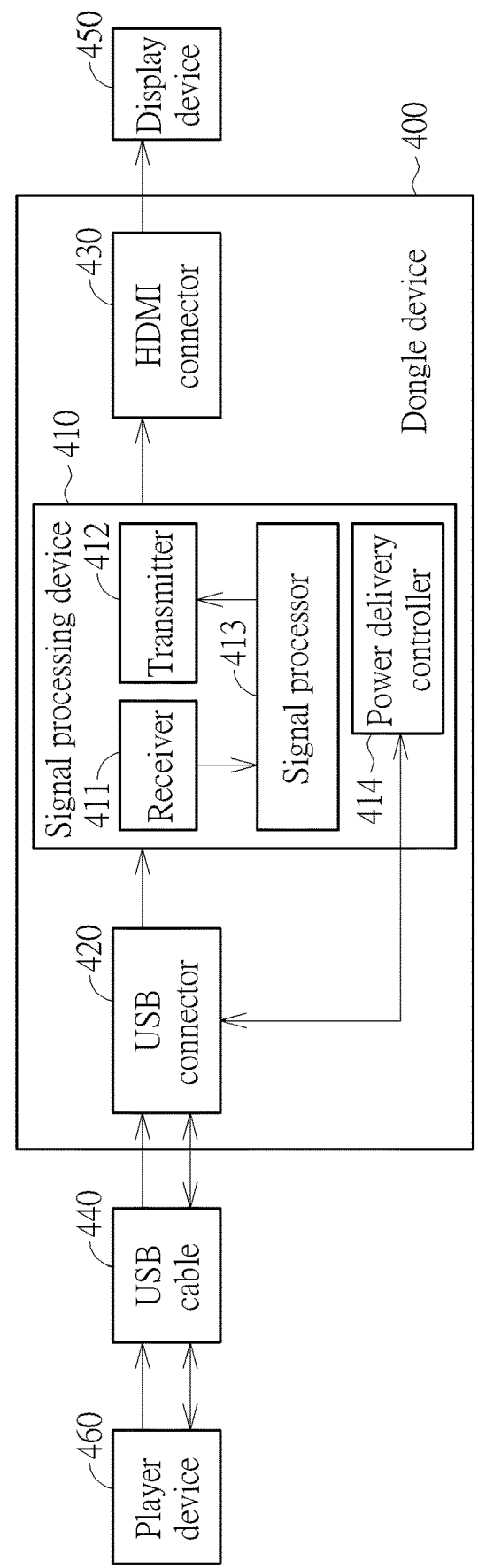
FIG. 4 shows a block diagram of the playback system according to the first embodiment of the invention.

FIG. 4 shows a block diagram of the playback system according to a first embodiment of the invention, which shows a possible implementation of the signal transmission device (e.g., the signal transmission device 20 in FIG. 1). In this embodiment, the signal transmission device is implemented as the dongle device 400 or implemented in the dongle device 400. One end of the dongle device 400 is coupled to the display device 450, for example, using a connector or a plug to insert into one port of the display device 450, and another end of the dongle device 400 is coupled to a USB cable 440 and the dongle device 400 is coupled to the player device 460 through the USB cable. That is, in this implementation, the signal transmission device comprising a signal processing device is only a component configured on a signal transmission path between the player device and the display device, and this signal transmission path may further comprise a cable coupled to the player device. It is to be noted that FIG. 4 only shows one of the various implementations of the invention. Therefore, the invention is not limited to the implementation shown in FIG. 4. For example, the dongle device 400 may also be designed as a device to be inserted in or coupled to a player device, that is, one end of the dongle device 400 is coupled to the player device 460 and another end is coupled to the display device 450 through a cable or a transmission line.

The dongle device 400 may comprise a signal processing device 410, a USB connector 420 and an HDMI connector 430. The signal processing device 410 may comprise a receiver 411, a transmitter 412, a signal processor 413, and a power delivery controller 414. In this embodiment, the receiver 411 may be a USB functional block, and the transmitter 412 may be an HDMI transmitter. The receiver 411 may be coupled to the USB connector 420, and the signal processing device 410 may receive the video signal (e.g., the first video signal) output by the player device 460 through the USB connector 420 and the USB cable 440 configured outside of the dongle device 400. The transmitter 412 may be coupled to the HDMI connector 430, and the video signal (e.g., the second video signal) being processed by the signal processing device 410 may be provided to the display device 450 through the HDMI connector 430.

The signal processor 413 may be a combination of multiple functional blocks in FIG. 2. For example, depending on the requirements of signal processing functions of the product, some of the functional blocks may be selected from the functional blocks shown in FIG. 2 to implement the signal processor 413. According to an embodiment of the invention, the signal processor 413 may detect an image format or an image resolution of the first video signal, and process the first video signal according to the image format or the image resolution to generate the second video signal. The image format of the second video signal may be different from the image format of the first video signal. For example, the image format of the second video signal may be converted into a higher-level image format supported by the display device 450, or the image resolution of the second video signal may be higher than the image resolution of the first video signal.

In addition, in an embodiment of the invention, the signal processor 413 may further detect a target image resolution supported by the display device 450, for example, by analyzing the communication signal transmitted between the player device 460 and the display device 450 to obtain information regarding the target image resolution supported by the display device 450 or the target image resolution that is desirable for the image received by the display device 450 to have, and when the image resolution of the first video signal is different from or fails to reach the target image resolution, the signal processor 413 may process the first video signal according to the target image resolution to generate the second video signal, so that the image resolution of the second video signal is equal to the target image resolution.

In addition, the signal processor 413 may also process the audio data of the first video signal, and package the processed audio data and the processed image data into the second video signal, so that the audio quality of the second video signal can also be improved.

The power delivery controller 414 may acquire power from the player device 460 through the USB connector 420 and provide the power to the internal components of the signal processing device 410 for the internal components to operate. For example, the one-way arrow in FIG. 4 points out the direction of video signal processing and transmission, and each direction of the two-way arrow represents the direction of the control signal and power signal transmitted between the power delivery controller 414 and the peripheral USB device.

It is to be noted that, in one embodiment of the invention, when the image resolution of the first video signal has reached the target image resolution, or the image/audio quality of the first video signal has reached the level required by the display device 450, the signal processor 413 may also directly output the first video signal as the second video signal without performing additional signal processing on the first video signal.

In addition, in another embodiment of the invention, when the image resolution of the first video signal has reached the target image resolution, or the image/audio quality of the first video signal has reached the level required by the display device 450, in order to further improve the signal quality, the signal processor 413 may further perform additional signal processing on the first video signal to generate a second video signal with better quality.

In addition, in yet another embodiment of the invention, if the player device 460 has already increased the image resolution of the first video signal according to the target image resolution, the signal processor 413 may also restore the image resolution of the first video signal to the original image resolution first, and then perform other image processing, such as image enlarging or other optimization processing, on the restored image to generate the second video signal with better image quality.

Figure 5:
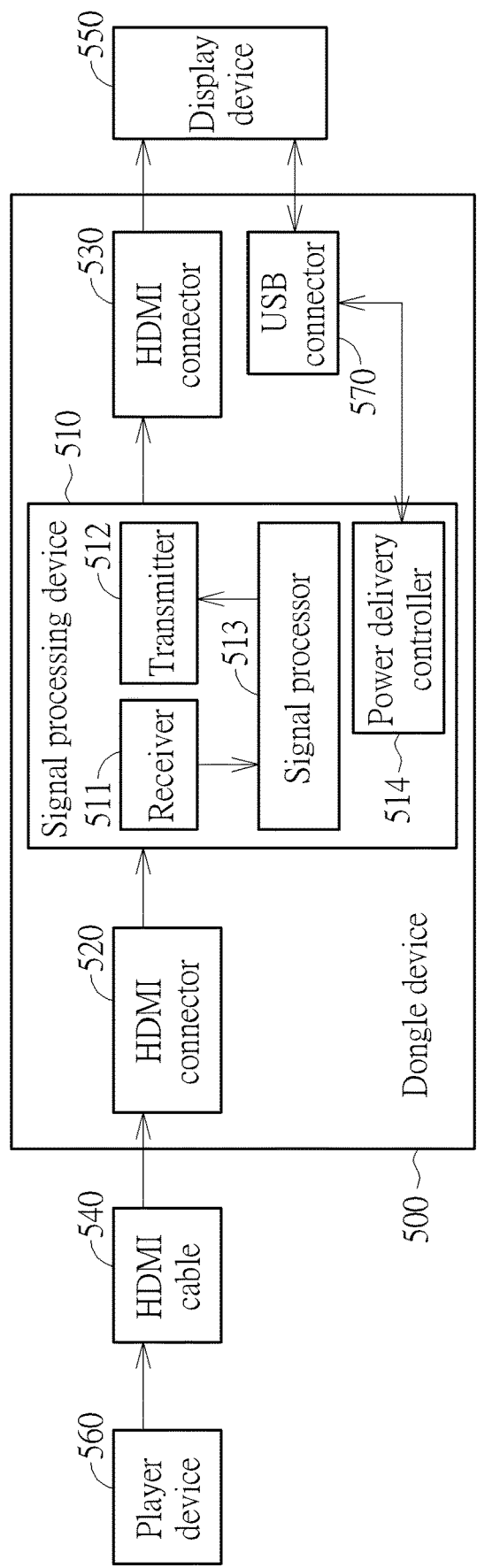
FIG. 5 shows another block diagram of the playback system according to the first embodiment of the invention.

FIG. 5 shows another block diagram of the playback system according to the first embodiment of the invention, which shows another possible implementation of the signal transmission device. In this embodiment, one end of the dongle device 500 is coupled to the display device 550, for example, using a connector or a plug to insert into one port of the display device 550, and another end of the dongle device 500 is coupled to an HDMI cable 540 and the dongle device 500 is coupled to the player device 560 through the HDMI cable 540. That is, in this implementation, the signal transmission device comprising a signal processing device is only a component configured on a signal transmission path between the player device and the display device, and this signal transmission path may further comprise a cable coupled to the player device. It is to be noted that FIG. 5 only shows one of the various implementations of the invention. Therefore, the invention is not limited to the embodiment shown in FIG. 5. For example, the dongle device 500 may also be designed as a device to be inserted into or coupled to the player device, that is, one end of the dongle device 500 is coupled to the player device 560, and another end is coupled to the display device 550 through a cable or a transmission line.

The dongle device 500 may comprise a signal processing device 510, HDMI connectors 520 and 530, and a USB connector 570. The signal processing device 510 may comprise a receiver 511, a transmitter 512, a signal processor 513, and a power delivery controller 514. In this embodiment, the receiver 511 may be an HDMI receiver, and the transmitter 512 may be an HDMI transmitter. The receiver 511 may be coupled to the HDMI connector 520, and the signal processing device 510 may receive the video signal output by the player device 560 through the HDMI connector 520 and the HDMI cable 540 configured outside of the dongle device 500. The transmitter 512 may be coupled to the HDMI connector 530, and the video signal processed by the signal processing device 510 may be provided to the display device 550 through the HDMI connector 530.

The signal processor 513 may also be a combination of multiple functional blocks in FIG. 2. In this embodiment, the operations of the signal processor 513 are similar to that of the signal processor 413. Therefore, the detailed description may refer to the relevant paragraphs in FIG. 4, and will be omitted here for brevity.

In this embodiment, the power delivery controller 514 may acquire power from the display device 550 through the USB connector 570, and provide the power to the internal components of the signal processing device 510 for the internal components to operate. For example, the one-way arrow in FIG. 5 points out the direction of video signal processing and transmission, and each direction of the two-way arrow represents the direction of the control signal and power signal transmitted between the power delivery controller 514 and the peripheral USB device.

Figure 6:
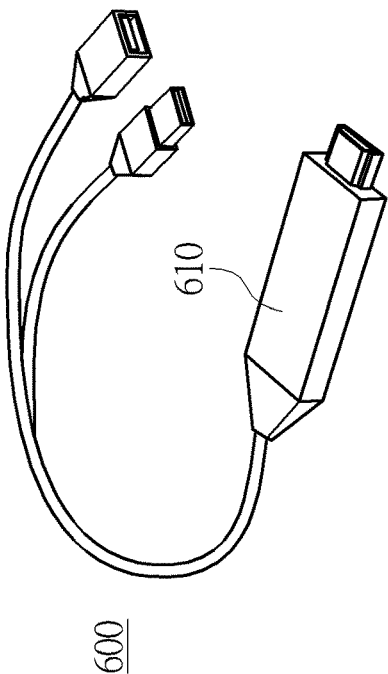
FIG. 6 is a schematic diagram showing an adaptor cable product according to an embodiment of the invention.

According to the second embodiment of the invention, the signal transmission device 20 may be implemented as or included in an adaptor cable. FIG. 6 is a schematic diagram showing an adaptor cable product according to an embodiment of the invention. The adaptor cable 600 may comprise the aforementioned signal processing device 610, one or more cables or transmission lines, and a plurality of connectors, e.g., the connector for coupling to a player device and the connector for coupling to a display device. The connector described herein may also be a plug or a socket. In the embodiment of the invention, when the signal transmission device 20 is implemented as or comprised in an adaptor cable (e.g., the adaptor cable 600), the signal transmission device 20 may be respectively connected to the player device and the display device through the cable and/or connector of the adaptor cable 600.

Figure 7:
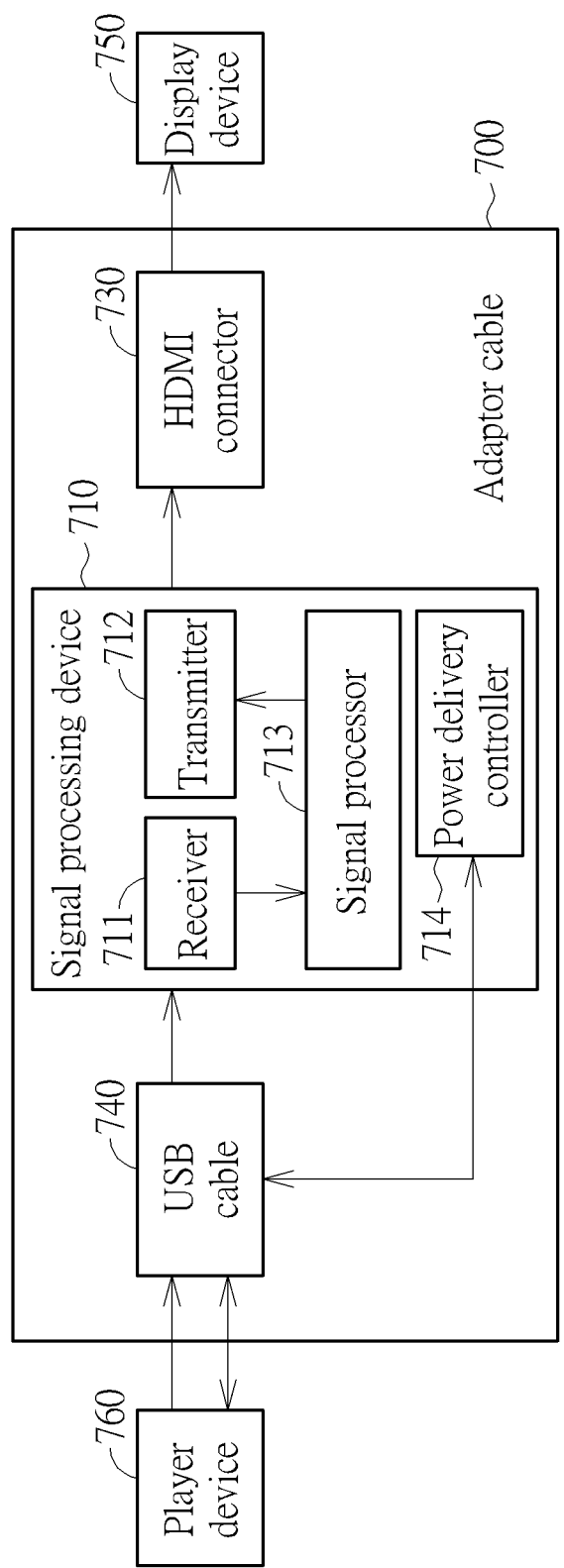
FIG. 7 shows a block diagram of the playback system according to the second embodiment of the invention.

FIG. 7 shows a block diagram of the playback system according to a second embodiment of the invention, which shows a possible implementation of the signal transmission device. In this embodiment, the signal transmission device is implemented as the adaptor cable 700 or implemented in the adaptor cable 700. One end of the adaptor cable 700 is coupled to the display device 750, for example, using a connector or a plug to insert into one port of the display device 750, and another end of the adaptor cable 700 is coupled to the player device 760, for example, using a connector or a plug to insert into one port of the player device 760. In this implementation, the signal transmission device comprising a signal processing device is the signal transmission component configured on a signal transmission path between the player device and the display device.

The adaptor cable 700 may comprise a signal processing device 710, an HDMI connector 730, and a USB cable 740. The signal processing device 710 may comprise a receiver 711, a transmitter 712, a signal processor 713, and a power delivery controller 714. In this embodiment, the receiver 711 may be a USB functional block, and the transmitter 712 may be an HDMI transmitter. The receiver 711 may be coupled to the USB cable 740. The signal processing device 710 may receive the video signal output by the player device 760 through the USB cable 740. The USB cable 740 may comprise at least a first end and a second end. The first end is coupled to the receiver 711, and the second end is coupled to the player device 760. The transmitter 712 may be coupled to the HDMI connector 730, and the video signal processed by the signal processing device 710 may be provided to the display device 750 through the HDMI connector 730.

The signal processor 713 may also be a combination of multiple functional blocks in FIG. 2. In this embodiment, the operations of the signal processor 713 are similar to that of the signal processor 413. Therefore, the detailed description may refer to the relevant paragraphs in FIG. 4, and will be omitted here for brevity.

In this embodiment, the power delivery controller 714 may acquire power from the player device 760 through the USB cable 740, and provide the power to the internal components of the signal processing device 710 for the internal components to operate. For example, the one-way arrow in FIG. 7 points out the direction of video signal processing and transmission, and each direction of the two-way arrow represents the direction of the control signal and power signal transmitted between the power delivery controller 714 and the peripheral USB device.

Figure 8:
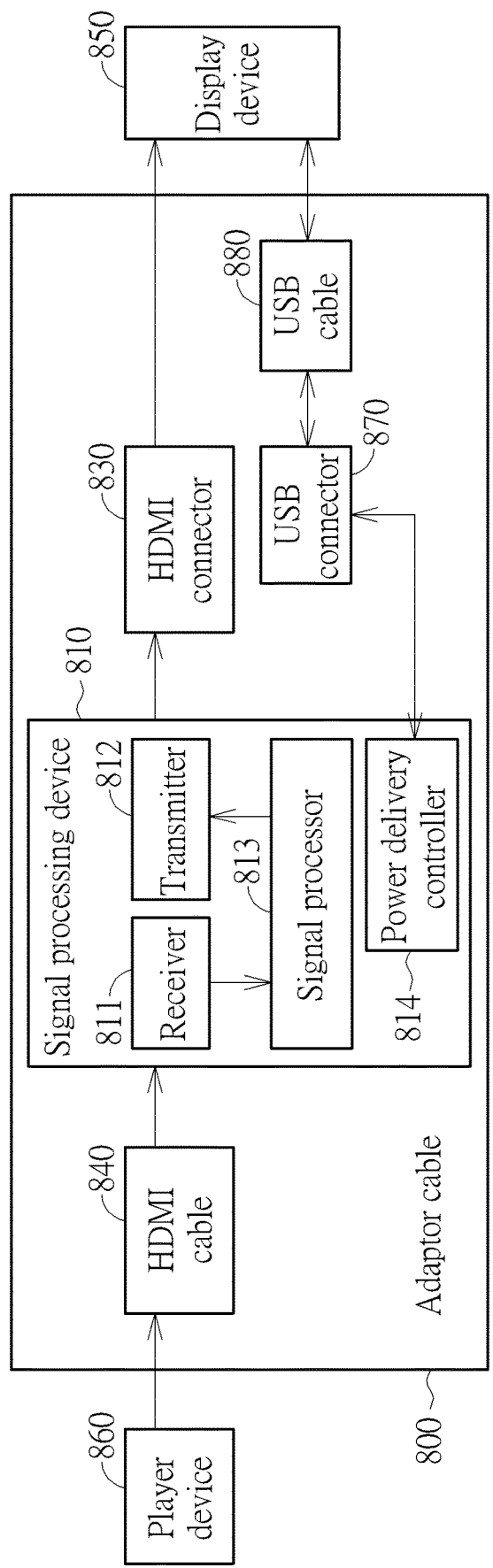
FIG. 8 shows another block diagram of the playback system according to the second embodiment of the invention.

FIG. 8 shows another block diagram of the playback system according to the second embodiment of the invention, which shows another possible implementation of the signal transmission device. In this embodiment, one end of the adaptor cable 800 is coupled to the display device 850, for example, using a connector or a plug to insert into one port of the display device 850, and another end of the adaptor cable 800 is coupled to the player device 860, for example, using a connector or a plug to insert into one port of the player device 860. In this implementation, the signal transmission device comprising a signal processing device is the signal transmission component configured on a signal transmission path between the player device and the display device.

The adaptor cable 800 may comprise a signal processing device 810, an HDMI connector 830, an HDMI cable 840, a USB connector 870, and a USB cable 880. The signal processing device 810 may comprise a receiver 811, a transmitter 812, a signal processor 813, and a power delivery controller 814. In this embodiment, the receiver 811 may be an HDMI receiver, and the transmitter 812 may be an HDMI transmitter. The receiver 811 may be coupled to the HDMI cable 840. The signal processing device 810 receives the video signal output by the player device 860 through the HDMI cable 840, where the HDMI cable 840 may comprise at least a first end and a second end. The first end is coupled to the receiver 811, and the second end is coupled to the player device 860. The transmitter 812 may be coupled to the HDMI connector 830, and the video signal processed by the signal processing device 810 may be provided to the display device 850 through the HDMI connector 830.

The signal processor 813 may also be a combination of multiple functional blocks in FIG. 2. In this embodiment, the operations of the signal processor 813 are similar to that of the signal processor 413. Therefore, the detailed description may refer to the relevant paragraphs in FIG. 4, and will be omitted here for brevity.

In this embodiment, the power delivery controller 814 may acquire power from the display device 850 through the USB connector 870 and the USB cable 880, and provide the power to the internal components of the signal processing device 810 for the internal components to operate. For example, the one-way arrow in FIG. 8 points out the direction of video signal processing and transmission, and each direction of the two-way arrow represents the direction of the control signal and power signal transmitted between the power delivery controller 814 and the peripheral USB device.

It is to be noted that FIG. 7 and FIG. 8 are merely utilized to respectively show one of the various embodiments of the invention. Therefore, the invention is not limited to the implementations shown in FIG. 7 and FIG. 8. For example, in one embodiment of the invention, the cable comprised in the adaptor cable may be coupled to one of the receiver and the transmitter, so that it may be further coupled to one of an external player device or display device through the cable. The other of the receiver and the transmitter may be coupled to the other of the player device or the display device through a connector. For example, when one end of the cable is coupled to the receiver, another end of the cable is coupled to the player device for receiving the first video signal from the player device. The transmitter may be coupled to the display device through a connector, and the second video signal is provided to the display device through the connector. On the other hand, when one end of the cable is coupled to the transmitter, another end of the cable is coupled to the display device for providing the second video signal to the display device through the cable. The receiver may be coupled to the player device through a connector for receiving the first video signal from the player device.

In the above embodiments, a variety of signal transmission devices with image/audio signal processing functionality are introduced. In addition to the image/audio signal processing functionality, the proposed signal transmission devices also have the properties of low production cost and easy installation. For example, the existing player device or display device can be directly used to present the video/audio data which was recorded in a relative low resolution or relative low image/audio quality with the ultra-high resolution or ultra-high image/audio quality by simply connecting the proposed signal transmission device to the existing player device or display device via a plug or a connector. In this manner, the aforementioned problem can be effectively solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal transmission device for transmitting at least a video signal between a player device and a display device, comprising:
   a signal processing device, comprising;
      a receiver, configured to receive a first video signal;
      a signal processor, coupled to the receiver and configured to detect an image format or an image resolution of the first video signal and process the first video signal according to the image format or the image resolution in order to generate a second video signal, wherein an image format of the second video signal is different from the image format of the first video signal or an image resolution of the second video signal is different from the image resolution of the first video signal; and
      a transmitter, configured to output the second video signal,
      wherein the signal processor is further configured to detect a target image resolution supported by the display device, and
      when the image resolution of the first video signal has been increased by the player device according to the target image resolution, the signal processor is configured to restore the image resolution of the first video signal to an original image resolution and perform image optimization processing to generate the second video signal.

2. The signal transmission device as claimed in claim 1, further comprising:
   a first connector, coupled to the transmitter, wherein the second video signal is provided to the display device through the first connector.

3. The signal transmission device as claimed in claim 2, wherein the first connector is a High Definition Multimedia Interface (HDMI) connector.

4. The signal transmission device as claimed in claim 2, further comprising:
   a second connector, coupled to the receiver, wherein the signal processing device is configured to receive the first video signal from the player device through the second connector and a cable.

5. The signal transmission device as claimed in claim 4, wherein the second connector is an HDMI connector.

6. The signal transmission device as claimed in claim 4, wherein the second connector is a Universal Serial Bus (USB) connector.

7. The signal transmission device as claimed in claim 1, further comprising:
   a cable, comprising at least a first end and a second end, wherein the first end is coupled to the receiver and the second end is coupled to the player device.

8. The signal transmission device as claimed in claim 7, wherein the cable is an HDMI cable.

9. The signal transmission device as claimed in claim 7, wherein the cable is an USB cable.

10. The signal transmission device as claimed in claim 1, wherein when the image resolution of the first video signal is different from the target image resolution, the signal processor is further configured to process the first video signal according to the target image resolution in order to generate the second video signal, and wherein the image resolution of the second video signal is equal to the target image resolution.

11. The signal transmission device as claimed in claim 1, wherein the signal processor is further configured to detect an audio format of the first video signal and process the first video signal according to the audio format in order to generate the second video signal.

12. A dongle device, comprising:
a signal processing device, comprising;
a receiver, configured to receive a first video signal;
a signal processor, coupled to the receiver and configured to detect an image format or an image resolution of the first video signal and process the first video signal according to the image format or the image resolution to generate a second video signal, wherein an image format of the second video signal is different from the image format of the first video signal or an image resolution of the second video signal is different from the image resolution of the first video signal; and
a transmitter, configured to output the second video signal; and
a first connector, coupled to the receiver; and
a second connector, coupled to the transmitter,
wherein the first video signal is received from a player device through the first connector and the second video signal is provided to a display device through the second connector, and
wherein the signal processor is further configured to detect a target image resolution supported by the display device, and
when the image resolution of the first video signal has been increased by the player device according to the target image resolution, the signal processor is configured to restore the image resolution of the first video signal to an original image resolution and perform image optimization processing to generate the second video signal.

13. The dongle device as claimed in claim 12, wherein the first connector is a Universal Serial Bus (USB) connector or a High Definition Multimedia Interface (HDMI) connector, and the second connector is a USB connector or an HDMI connector.

14. An adaptor cable, comprising:
a signal processing device, comprising;
a receiver, configured to receive a first video signal;
a signal processor, coupled to the receiver and configured to detect an image format or an image resolution of the first video signal and process the first video signal according to the image format or the image resolution in order to generate a second video signal, wherein an image format of the second video signal is different from the image format of the first video signal or an image resolution of the second video signal is different from the image resolution of the first video signal; and
a transmitter, configured to output the second video signal;
a cable, coupled to one of the receiver and the transmitter; and
a connector, coupled to another of the receiver and the transmitter,
wherein when the cable is coupled to the receiver, the first video signal is received from a player device through the cable and the second video signal is provided to a display device through the connector; and when the cable is coupled to the transmitter, the first video signal is received from the player device through the connector and the second video signal is provided to the display device through the cable, and
wherein the signal processor is further configured to detect a target image resolution supported by the display device, and
when the image resolution of the first video signal has been increased by the player device according to the target image resolution, the signal processor is configured to restore the image resolution of the first video signal to an original image resolution and perform image optimization processing to generate the second video signal.

15. The adaptor cable as claimed in claim 14, wherein the cable is a High Definition Multimedia Interface (HDMI) cable or a Universal Serial Bus (USB) cable, and the connector is an HDMI connector or a USB connector.

* * * * *